United States Patent Office 2,742,406
Patented Apr. 17, 1956

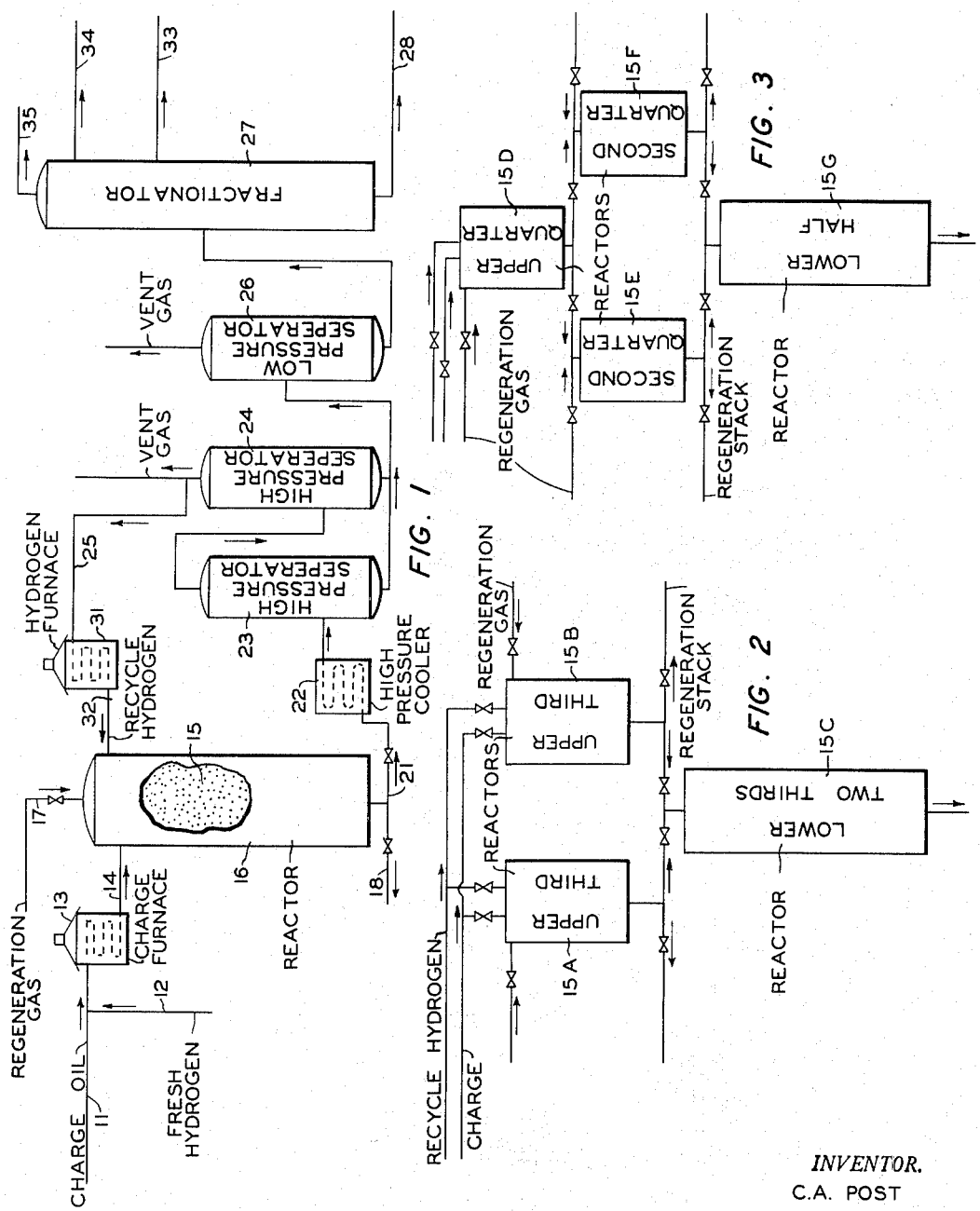

2,742,406

METHOD OF COMPENSATING FOR UNEVEN COKE DEPOSITION IN THE CATALYST BED IN A HYDROGENOLYSIS PROCESS

Carl A. Post, Bartlesville, Okla., assignor to Phillips Petroleum Company, a corporation of Delaware Application September 24, 1951, Serial No. 247,979

10 Claims. (Cl. 196—53)

This invention relates to an improved hydrogenolysis process and the reactivation of the catalyst employed therein. In one of its aspects it relates to lengthening the period between shutdowns for catalyst regeneration in a hydrogenolysis process. A preferred embodiment of my invention relates to a method for locating and compensating for uneven coking in the catalyst bed in a hydrogenolysis process.

The destructive hydrogenation or hydrogenolysis of heavy residual hydrocarbon stocks such as reduced crude, vacuum reduced crude, topped crude cracking residuum, and like stocks, has been known for some time. Useful products which can be recovered from such a process include hydrocarbons in the boiling range of gasoline, diesel oil, fuel oil, and light gas oil. Usually the gasoline boiling range materials are not of exceptional quality and must be subjected to further treatment such as reforming to provide a good grade gasoline.

Although hydrogenolysis can be conducted non-catalytically, catalytic reactions are preferable from the standpoint of product quality and yield. Catalysts commonly employed include oxides of molybdenum, chromium, and vanadium, and sulfides of molybdenum, tungsten and nickel. Other catalysts may be used especially when sulfur-free stocks are treated. The process is usually carried out with concurrent flow of all reactants in mixed or in liquid phase, and at pressures in the range of 1,000–20,000 p. s. i. g. and at temperatures, varying considerably, but generally in the range of 800 to 1000° F.

One difficulty commonly encountered in hydrogenolysis processes is short catalyst life resulting from excessive carbon deposition on the catalyst surface. In many instances the deposition is so great as to appreciably impede the passage of reactants.

It is an object of this invention to provide an improved method for reactivating the catalyst in a hydrogenolysis process.

Another object of this invention is to lengthen the intervals between regeneration periods for a hydrogenolysis catalyst.

A further object of this invention is to provide a method for locating and controlling the point of maximum coke deposition in the catalyst bed in a hydrogenolysis process.

Still another object of this invention is to provide a method for compensating for uneven coke deposition in the catalyst bed in a hydrogenolysis process.

Further objects and advantages of this invention will be apparent to one skilled in the art from the accompanying discussion and disclosure.

I have found in hydrogenolysis that the top portion of the catalyst bed acts as a prehydrogenolysis zone wherein the predominating reaction is hydrogenation of the aromatics, olefins, sulfur compounds, oxygen compounds and other easily hydrogenated materials. Since these reactions are exothermic there is a zone of rapid increase in temperature, with consequent increase in the rate and amount of cracking taking place, until a point is reached where the cracking reaction predominates. This point is marked by a "peaking temperature" which in some cases actually represents a peak temperature and in other cases represents a marked decrease in the rate of temperature increase. However, in every case the "peaking temperature" is characterized by a marked decrease in the rate of temperature increase. I have found that it is in the zone immediatedly following this "peaking temperature" that the maximum deposition of coke occurs. Following this prehydrogenolysis zone is the true hydrogenolysis zone where the two reactions, cracking and hydrogenation, are approximately in balance and the temperature levels out, or can be made to do so.

I have further found that the point at which this "peaking temperature" occurs can be controlled and caused to occur in the early part of the catalyst bed thereby causing the maximum coke deposition always to occur in said early part of the bed. This is a great advantage in the operation of hydrogenolysis units and the regeneration of catalysts used therein as is explained more fully elsewhere herein.

In carrying out my invention it is necessary to know the reaction temperature at a plurality of points throughthe catalyst bed to determine the point in the overall bed of a peaking temperature. As stated earlier, this peaking temperature will be characterized in some instances by an actual peak temperature and in others merely by a marked decrease in the rate of temperature increase. An important feature of my invention is controlling the point in the catalyst bed where this peaking temperature occurs, for, as I have discovered, it is at this point and immediately following in the bed that the maximum coke deposition on the catalyst takes place. Broadly, any method for controlling the point in the catalyst bed at which this peaking temperature will occur is within the scope of my invention. As one skilled in the art will readily appreciate, there are many variables which will affect the point at which said peaking temperature will occur, such as the nature of the feed stock, the inlet temperature of the charge, the space velocity, the pressure, the average reaction temperature, the hydrogen partial pressure and circulation rate, etc. For any given feed stock, other variables remaining constant, the greatest degree of control of said point will be effected by varying the inlet temperature of the charge and this is the preferred way of operating. Variation of the other variables will affect the point of the peaking temperature but not to the extent that varying the inlet temperature of the charge material will.

As stated hereinbefore, I have discovered that the top portion of the catalyst bed acts as a prehydrogenolysis zone. This will be a zone of rapid temperature increase, and depending upon the nature of the feed stock and the inlet temperature of the charge material, the peaking temperature will occur in a particular place in the bed. In accordance with my invention it is possible, knowing where in the bed that maximum coke deposition will occur, to compensate for the uneven coking by dividing the catalyst bed into larger and smaller portions insuring that the peaking temperature occurs in a smaller portion, and providing an alternate for said smaller portion so that the catalyst therein can be regenerated while the other is on stream. Thus I have provided a mode of operating a hydrogenolysis process which has many advantages over the normal procedure. My method of operating will lengthen the period between costly shutdowns for regeneration of the entire catalyst bed and will make regeneration less costly because a smaller amount of catalyst with a lower pressure drop will be regenerated instead of the entire catalyst bed.

Refer now to Figure 1 of the drawings. Illustrated is a schematic diagram of an ordinary hydrogenolysis process, usually carried out at temperatures in the range of 800 to 1000° F. and pressures varying from 500 to 20,000 p. s. i. g. Pumps, valves, compressors, and other miscellaneous equipment are not shown, but the necessity of their presence in carrying out a hydrogenolysis process will be readily appreciated. Petroleum residuum charge oil in line 11 is admixed with fresh hydrogen from line 12 and the admixture heated to the desired temperature level in charge furnace 13. In accordance with my invention this temperature will be chosen judiciously in conjunction with the other considerations hereinbefore mentioned. The heated charge is passed through line 14 to reactor 16 where it is contacted with a hydrogenolysis catalyst. The pressure is usually sufficient to keep the residuum material in the liquid phase. The top of catalyst bed 15 will act as a prehydrogenolysis zone and at some point in the catalyst bed a peaking temperature can be determined. This can be accomplished by observing the temperature of the reaction at a plurality of points in the bed. One method of doing this is to have a thermo-well down the center of the reactor containing a multiplicity of thermocouples whose junctions are at various levels of the reactor bed. Under the same conditions of inlet temperature, pressure, space velocity, hydrogen circulation, etc., different charge oils will have peaking temperatures at different points in the catalyst bed. For example for a mixed base 20% bottoms from a Texas Panhandle crude the peaking temperature will usually occur in the second quarter of the bed; whereas for an aromatic base stock such as from some California crudes, the peaking temperature will usually occur in the third quarter. In accordance with my invention the location of this peaking temperature can be controlled by adjusting the inlet temperature of the charge. Thus an aromatic base stock will be charged at a lower temperature than a less aromatic base stock since such a stock contains a greater mount of unsaturates and prehydrogenation of same will result in a larger rise in temperature.

It is also possible to carry out automatically the determination and control of the point in the catalyst bed at which the peaking temperature occurs. Suitable instruments of a conventional type can readily be chosen by those skilled in the art to determine automatically and continuously (or intermittently) the point of marked decrease in the rate of temperature increase, whether a maximum temperature or not, in a series of temperature readings taken along the length of the reactor and in response to a peaking temperature at a level other than at a predetermined level in the catalyst bed a motor valve in either the fuel line or combustion air line to the charge furnace can be automatically controlled to adjust the inlet temperature of the charge material so that the peaking temperature occurs at the desired level. Thus, if the instrument is set to maintain the peaking temperature at the 18 ft. level in a bed having an effective length of 50 ft. and the peaking temperature in fact occurs in the 26 ft. level, a motor valve in the fuel line to the charge furnace will open to increase the temperature of the charge material until the peaking temperature again occurs at the desired level. And, conversely, if the peaking temperature occurs at the 10 ft. level, the temperature of the charge will be lowered until the peaking temperature again occurs at the desired level.

Liquid phase effluent from reactor 16 leaves via line 21 and passes through high pressure cooler 22 along with some vapors formed in the catalyst bed to high pressure separators 23 and 24 which are connected in series. The vent gas leaving separator 24 is approximately 75% hydrogen and a portion of it is recycled via line 25 to furnace 31 and then through line 32 into reactor 16. It is also a common practice to use some of the cool recycle hydrogen before passage to furnace 31 as cooling hydrogen, admitted to the reactor at several points to control the reaction. The bottoms from separators 23 and 24 pass to low pressure separator 26 from which more gas is vented and then to fractionation zone 27 where the various fractions are removed through lines 33, 34 and 35. The bottoms leaving line 28 may be recycled to line 11 and treated again. Reactivation of the catalyst bed is accomplished by passing a regeneration gas through line 17, through bed 15 and out regeneration stack 18.

Figures 2 and 3 show two embodiments of my invention which may be employed to compensate for the uneven coking of the catalyst which occurs in a hydrogenolysis process. In Figure 2 the peaking temperature is caused to occur in the upper third, preferably the upper quarter, of the overall catalyst bed as hereinbefore described. Thus 15A may be on stream in series with 15C while 15B is being regenerated. By alternating 15A and 15B on stream and on regeneration the period between shutdowns to regenerate the entire catalyst bed is lengthened considerably. In Figure 3 the peaking temperature is caused to occur in the early part of the second quarter of the total amount of catalyst to be traversed. Hence 15E may be on stream in series with 15D and 15G while 15F is being regenerated. In reactivating the catalyst a gas containing aproximately 2 per cent oxygen with sufficient inert diluents such as steam or flue gas to maintain the regeneration temperature at about 1000° F. is employed. Figure 2 shows inlet and outlet lines for regeneration gas when regenerating beds 15A, 15B and 15C. When it is necessary to regenerate 15C the regeneration gas will pass through either 15A or 15B and down through 15C. In Figure 3, when 15D and/or 15G need to be regenerated, the regeneration gas passes through 15D, 15E or 15F and down through 15G.

The following examples illustrate one embodiment of my invention wherein it is evident that the point of maximum coke deposition on the catalyst in a hydrogenolysis process is defined by a peaking temperature.

EXAMPLE I 8.1 gallons per hour of topped crude having an API gravity of 23.0 and representing the 20 per cent bottoms from a Texas Panhandle crude were charged to a hydrogenolysis reactor together with fresh and recycle hydrogen in the ratio of approximately 35,000 s. c. f. per barrel of oil charge. The flow of oil and hydrogen was co-current down over the molybdenum oxide on alumina calatlyst. Average operating conditions were: space velocity 0.9 volume of oil per volume of catalyst per hour; average catalyst bed temperature 850° F.; and pressure 5000 p. s. i. g. A "peaking temperature" was observed at a point seven feet from the top of the catalyst bed. The hydrogen consumption was approximately 1150 s. c. f. per barrel of oil charge. The total liquid effluent from the reactor had an API gravity of 35.0. 67.5 per cent of the material boiling above 850° F. was converted to products having a boiling point below 850° F. After a period of operation at the above conditions, the unit was shut down, the catalyst bed purged with superheated steam and then regenerated by burning the deposited carbon at a maximum temperature of 1150-1200° F. with a mixture of steam and air in conventional manner. During this burning process, it was observed that the coke deposition in the catalyst bed was uneven and that a definite maximum had occurred in the second quarter of said bed. These data are shown in Table I below.

EXAMPLE II 20.7 gallons per hour of the same oil used in Example I were charged to a hydrogenolysis reactor in the same manner as described. Average operating conditions were: spaced velocity 2.3 volumes of oil per volume of catalyst per hour; average catalyst bed temperature 873° F.; and pressure 5000 p. s. i. g. A "peaking temperature" was observed at a point nine feet from the top of the catalyst bed. The hydrodgen consumption was approximately 870 s. c. f. per barrel of oil charge. The total liquid effluent from the reactor had an API gravity of 33.5. 55.6 per cent of the material boiling above 850° F. was converted to products having a boiling point below 850° F. After a period of operation the unit was shut down and the catalyst regenerated as described in Example I. During the burning process, it was observed that the coke deposition in the catalyst bed was uneven and that a definite maximum had occurred in the second quarter of said bed. These data are shown in Table I below.

Table I

| Reactor Zone, Ft. | Distribution of Carbon, Percent by Wt. | |
|---|---|---|
| | Example I | Example II |
| 0–6.5 (1st quarter) | 13.4 | 13.6 |
| 6.5–13.0 (2nd quarter) | 34.2 | 37.0 |
| 13.0–19.5 (3rd quarter) | 26.1 | 23.2 |
| 19.5–26.0 (4th quarter) | 26.3 | 26.2 |
| | 100.0 | 100.0 |

These data are in agreement with observations on pressure drop across the catalyst bed observed at the end of the processing periods of the above examples. Prior to regeneration it was observed that the main pressure drop in Example I was between the 4 and 8 ft. levels with the actual maximum between the 7 and 8 ft. levels and the next greatest drop between the 6 and 7 ft. levels Thus the maximum coke deposition was in the second quarter of the bed.

At the end of the processing period covered by Example II and prior to regeneration two regions of appreciable pressure drop were observed. The first and greatest occurred between the 7 and 13 ft. levels with the actual maximum between the 9 and 10 ft. levels. The second region of appreciable pressure drop occurred between the 19 and 23 ft. levels with the maximum for this region between the 22 and 23 ft. levels. Thus it can be seen that the pressure drop data agrees with the regeneration data and the region of maximum coke deposition again was the second quarter of the catalyst bed. The region of increased coke deposition and increased pressure drop that occurred in the fourth quarter of the catalyst bed during the processing period of Example II was caused by upset operating conditions. During the run the abnormally high temperature of 888° F., fifteen degrees above the average temperature of 873° F., was observed in this region. This is sufficient to cause a substantial increase in the cracking rate and therefore increased coke deposition.

By way of example the temperature of the oil feed to the reactor in Examples I and II was 825° F. and 840° F. respectively. For a more paraffinic stock containing little if any easily hydrogenated materials such as aromatics, olefins, etc., this initial oil feed temperature would be higher and closer to the average catalyst bed temperature at which it is desired to operate. For the examples given these temperatures would be approximately 840 and 860° F. respectively for such a stock. For a highly aromatic stock, such as from some California crudes, the temperature of the oil feed would necessarily be much lower due to the higher concentration of easily hydrogenated materials, which would result in a greater initial temperature increase. For the examples given these temperatures would be in the range of 700–750° F. In addition to being affected by the desired average operating temperature and the nature of the feed stock the chosen oil feed temperature will, of course, be affected by such other interrelated variables as charge rate, space velocity, pressure, catalyst used, etc. In view of this disclosure the effect of these variables will be readily understood by those skilled in the art.

I claim:

1. An improved process of hydrogenolysis comprising passing a mixture of hydrogen gas and vaporized residual hydrocarbon stock downwardly through a reaction zone under a pressure of 500 to 20,000 p. s. i. and in the presence of a fixed bed of hydrogenolysis catalyst maintained at a temperature of 800 to 1000° F., said reaction zone being divided into a plurality of sections physically separated but arranged to permit the reactants to flow in series through them, the reactants are continuously admitted to the uppermost section and the reaction product continuously withdrawn from the lowermost section of the series, localizing the region of maximum coke deposition on the catalyst to one of the upper sections by suitable adjustment of the reaction conditions and the inlet temperature of the charge, providing an alternate and separate counterpart for said section of maximum coke deposition, said alternate being connected in parallel therewith, periodically diverting the reactants stream from its path of flow through said section of maximum coke deposition to and through said alternate wherein the reaction continues without interruption, the activity of the off-stream section being renewed during said diversion by regeneration of the catalyst therein, and subsequently switching the regenerated section back onstream while its alternate undergoes catalyst regeneration, whereby a continuous flow of reactants is maintained through said series of reaction zones.

2. The process of claim 1 wherein the reaction zone is divided into two separate sections connected in series, an upper third and a lower two-thirds, with an alternate being provided for the upper third.

3. The process of claim 1 wherein the reaction zone is divided into three separate sections connected in series, two upper quarters and a lower half, with an alternate being provided for the second quarter.

4. The process of claim 1 wherein the catalyst is alumina-molybdena.

5. In a hydrogenolysis process wherein a mixture of $H_2$ gas and vaporized topped crude is passed through a reaction zone under a pressure of about 5000 p. s. i. and in contact with a fixed bed of alumina-molybdena catalyst maintained at an average temperature of 850 to 875° F., wherein the predominant reaction in the upper portion of said reaction zone is hydrogenation which is characterized by rapid increase in temperature, the predominant reaction in the succeeding portion of the reaction zone is cracking which is characterized by a peaking temperature, indicated by a marked decrease in the rate of temperature increase, cracking and hydrogenation are approximately in balance in the remainder of the reaction zone so that here the temperature levels out, the reaction products are withdrawn at the base of the reaction zone, and wherein the maximum deposition of coke on the catalyst is in the section immediately succeeding that in which the temperature peaks, the improvement comprising dividing the upper half of the reaction zone into a first and second quarter physically separated from the lower half and from each other but arranged to permit the reactants to flow in series through the first quarter, second quarter, and lower half, providing an alternate second quarter through which the reactants flow may be diverted while the off-stream quarter undergoes catalyst regeneration, localizing the peaking temperature in the second quarter so as to confine the maximum coke deposition to that quarter, periodically diverting the reactants stream from its path of flow through the second quarter to and through said alternate, the activity of the off-stream section being renewed during said diversion by regeneration of the catalyst therein, and subsequently placing the regenerated section back on-stream while its alternate undergoes catalyst regeneration.

6. A method of locating and controlling the point of maximum coke deposition in the catalyst bed in a hydrogenolysis process which compreses determining the point in the bed of a peaking temperature, the maximum coke deposition occurring in the zone immediately adjacent said point of peaking temperature and on the downstream side thereof, and controlling the location of said point in the catalyst bed by adjusting the reaction conditions, whereby the subsequent regeneration of the catalyst bed can be limited to the zone of maximum coke deposition, the remainder of the bed remaining onstream.

7. Process of claim 6 wherein the point in the bed of peaking temperature is controlled by adjusting the inlet temperature of the charge.

8. A method of compensating for uneven coke deposition in the catalyst bed in a hydrogenolysis process which comprises determining under given reaction conditions the point of maximum coke deposition as indicated by a peaking temperature, dividing the catalyst bed into larger and smaller portions so arranged that the reactants flow from the smaller into the larger, adjusting the reaction conditions to cause said peaking temperature to occur in a selected smaller portion, providing an alternate for the latter portion, periodically diverting the charge from said selected portion through said alternate so that catalyst in the selected portion can be regenerated, and then resuming the flow through the regenerated portion and regenerating the alternate.

9. Process of claim 8 wherein the reaction variable used to fix the zone of maximum coke deposition is the inlet temperature of the charge material.

10. In a hydrogenolysis process wherein the charge flows over a catalyst arranged in the form of a solid bed, wherein the temperature of the bed in one zone attains a peaking temperature which is characterized by a marked decrease in the rate of temperature increase, and wherein the region of maximum coke deposition is immediately downstream from the peaking temperature zone, the improvement comprising dividing the catalyst bed into three consecutive zones, namely, a first quarter, a second quarter, and a last half, the feedstock passing through the zones in the order stated, adjusting the inlet temperature of the charge to cause said peaking temperature and attendant maximum coke deposition to occur in the second quarter, providing an alternate second quarter, passing the charge alternately through the second quarter and through its alternate, and regenerating the one which is off-stream while the other is onstream.

References Cited in the file of this patent

UNITED STATES PATENTS

| | | |
|---|---|---|
| 2,227,671 | Pier et al. | Jan. 7, 1941 |
| 2,330,069 | Marshall | Sept. 21, 1943 |
| 2,541,229 | Fleming | Feb. 13, 1951 |
| 2,606,862 | Keith | Aug. 12, 1952 |

OTHER REFERENCES

"Conversion of Petroleum," Sachanen, 2nd edition, Reinhold Pub. Co., New York, 1948, pages 399 and 400.